United States Patent [19]

Lang et al.

[11] 4,270,331
[45] Jun. 2, 1981

[54] METHOD OF SECURING AN EXPANSION DOWEL INCLUDING A METALLIC EXPANSION SLEEVE

[75] Inventors: Gusztav Lang, Munich; Peter Mauthe, Neu-Ulm, both of Fed. Rep. of Germany

[73] Assignee: Hilti Aktiengesellschaft, Furstentum, Liechtenstein

[21] Appl. No.: 18,852

[22] Filed: Mar. 8, 1979

[30] Foreign Application Priority Data

Mar. 10, 1978 [DE] Fed. Rep. of Germany ....... 2810503

[51] Int. Cl.³ .......................... E04B 1/49; E21D 20/00
[52] U.S. Cl. ........................................ 52/744; 52/704
[58] Field of Search .................. 404/259, 260–261; 52/744, 704, 727, 741, 742, 698

[56] References Cited

U.S. PATENT DOCUMENTS

| 2,667,037 | 1/1954 | Thomas | 405/260 |
|---|---|---|---|
| 2,992,131 | 7/1961 | Bricknell | 52/727 |
| 3,618,326 | 11/1971 | Montgomery | 52/698 |
| 4,157,677 | 6/1979 | Deutschenbaur | 85/79 |

Primary Examiner—John E. Murtagh
Attorney, Agent, or Firm—Toren, McGeady and Stanger

[57] ABSTRACT

An expansion dowel formed of an axially extending metal sleeve has slots extending axially from its leading end for a portion of its length toward its trailing end. The bore through the sleeve consists of a threaded portion extending from the trailing end and a frusto-conically shaped portion extending from the threaded portion to the leading end of the sleeve. After the sleeve is inserted into a borehole in a receiving material it is anchored in the borehole by displacing a frusto-conically shaped cone through the frusto-conically shaped portion of the bore toward the leading end of the sleeve. The trailing end of the cone is located within the sleeve axially inwardly of the trailing ends of the slots. A flowable substance is injected into the bore of the sleeve so that it flows outwardly through the slots into the open spaces between the outside surface of the sleeve and the surface of the borehole. The flowable substance includes a material for protecting the sleeve against corrosion.

18 Claims, 2 Drawing Figures

METHOD OF SECURING AN EXPANSION DOWEL INCLUDING A METALLIC EXPANSION SLEEVE

SUMMARY OF THE INVENTION

The present invention is directed to a method of securing an expansion dowel including a metallic expansion sleeve in a borehole. The sleeve has slots extending in its axial direction from its leading end, that is, the end first inserted into the borehole, toward its trailing end. Further, the sleeve has an axial bore with a threaded portion extending from its trailing end and a frusto-conical portion increasing in diameter from its leading end toward the trailing end. A threaded bolt can be inserted into the threaded portion of the sleeve. When inserted into the borehole, an expanding cone is displaced axially through the frusto-conical portion of the bore for spreading the slotted portion of the sleeve radially outwardly into anchored engagement with the surface of the borehole. Subsequently, a flowable substance is injected into the bore of the sleeve so that it flows outwardly through the slots into the open spaces between the outside surface of the sleeve and the surface of the borehole.

Generally, high strength anchoring dowels are produced out of metal. For economic reasons, steel is the preferred material for such dowels, however, it has the disadvantage that it tends to corrode. To protect against corrosion, it has been known to form the essential parts of the dowel out of non-rusting steels or to provide a galvanized coating on the steel. The use of non-rusting steels makes such dowels very expensive, while a galvanized coating guarantees only a conditional protection against corrosion, especially if a crevice action cannot be excluded, because the galvanized layer is quickly worn away due to crevice corrosion.

In the German Gebrauchsmuster No. 71 34 660, a metal dowel of the general type mentioned above is disclosed. When an expansion cone is inserted into a tapered portion of the bore in the dowel, the slotted leading end portion of the expansion sleeve is spread radially outwardly. Furthermore, a container filled with an adhesive substance is inserted between the cone and the leading end of the dowel and, when the cone is displaced toward the leading end, the container is broken and its contents spread into the space between the sleeve and the borehole by flowing through the slots in the sleeve. Since the adhesive substance is pushed forwardly by the cone as it is inserted, the adhesive substance develops such high pressures that a partial displacement of the sleeve rearwardly out of the borehole may occur. This displacement effect is intensified because the adhesive substance acts a lubricant in the space between the sleeve and the surface of the borehole before the sleeve is expanded and anchored within the borehole. As a result, insufficient anchoring values are achieved by the expansion dowel and the dowel does not remain in the intended position.

In German Pat. No. 933,328 another expansion dowel is disclosed. In this dowel the expansion sleeve which contains slots, is radially expanded by inserting an expanding cone. After the sleeve is anchored, grout is forced into the space between the borehole and the sleeve flowing outwardly from the bore within the sleeve through the longitudinal slots and additional apertures. While the grout does not have a negative effect on the anchoring values of the dowel, it does not provide sufficient protection against corrosion, accordingly, the anchoring effect is endangered by the possibility of corrosion.

Therefore, the primary object of the present invention is to provide a method of anchoring an expansion dowel which assures protection against corrosion for the metal expansion sleeve of an expansion dowel without affecting the anchoring values achieved by the dowel.

In accordance with the present invention, the desired corrosion protection is provided by anchoring the expansion sleeve within the borehole and then injecting a material into the open spaces between the sleeve and the surface of the borehole which provides the desired corrosion protection.

Injecting the flowable substance can be provided by a member with a discharge aperture which forces the substance into the bore of the expansion sleeve. Alternatively, the end of the member containing the discharge aperture can be threaded into the threaded portion of the bore in the expansion sleeve. A grease gun can be used as such an injection member. Further, the injection member can be arranged to receive cartridges containing the flowable substance. If several cartridges are inserted into the injection member, different components can be provided in the cartridges which mix together when the cartridges are broken and the flowable substance is injected out of the member into the bore of the sleeve.

When a sufficient amount of the flowable substance is injected into the expansion sleeve so that it flows out of the open space between the sleeve and the borehole, it is assured that all of the surfaces of the expansion dowel are sufficiently coated and protected against corrosion. It is also possible to assure such corrosion protection of the dowel by injecting a premeasured amount of the flowable substance. After the substance is injected into the bore of the sleeve, a threaded bolt can be screwed into the bore providing a compressing action on the flowable substance so that it flows through and out of the open space between the sleeve and the borehole. It is also possible to inject the flowable substance by filling it into a breakable container and placing the container in the bore of the sleeve after the sleeve has been anchored in the borehole. By threading the bolt into the bore against the container, the container can be broken so that the flowable substance passes through the slots in the sleeve outwardly into the open spaces between the sleeve and the borehole.

To assure that the trailing end of the expansion sleeve is protected against corrosion, it is spaced within the borehole inwardly of the surface of the material in which the borehole is formed. When the flowable substance exits from the open space between the sleeve in the borehole, it can cover the trailing end of the sleeve and provide corrosion protection at that location. The depth to which the trailing end of the sleeve is inset within the borehole is preferably equal to about the outside diameter of the sleeve.

Materials are suitable for use as the flowable substance if they provide a good wetting action and seal the metal surface of the expansion dowel for a long time protection against corrosion. The flowable substance may be hardenable or remain plastic. A hardenable flowing substance can include a liquid synthetic resin as the binder to which blocked hardeners are added which provide a hardening effect of the binder due to the influence of air, humidity or the like. Apart from a flowable substance which includes as the binder, oils which are dry under oxidizing action, the flowable substance can also consist of a one component resin which hardens under the influence of moisture with a volume increase. Accordingly, a polyisocyanate pre-polymer can be used as the raw material. In place of hardenable flowable substances, materials which remain in the plastic state can be used. An example of such materials include softened bitumen, softened coal tar pitch, softened resins, softened synthetic resins or mixtures of any of these. Another possibility as the flowable substance is the combination of a cement and an oily binder which remains soft. Binders for the cement can be mineral oil, plastics material or a mixture of the two.

Preferably, the flowable substance includes pigments which provide corrosion protection. Accordingly, red lead, calcium plumbate or chromate pigments can be used.

When hardenable materials are used as the flowable substance, it is helpful to ensure that the threaded portion of the sleeve can continue to be used so that a threaded bolt can be removed and replaced. Either one or both of the threads on the bolt and the threads in the bore of the sleeve can be protected with anti-bonding agent. Artificial wax can be used as the anti-bonding agent.

Further, it has also been known to coat the surface of the dowels with a protective layer, such as a layer of epoxy resin, to provide corrosion protection. Since such protective layers are often damaged when the dowel is inserted, it is also possible to use the method embodying the present invention when dowels are used which already include a corrosion protection layer.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
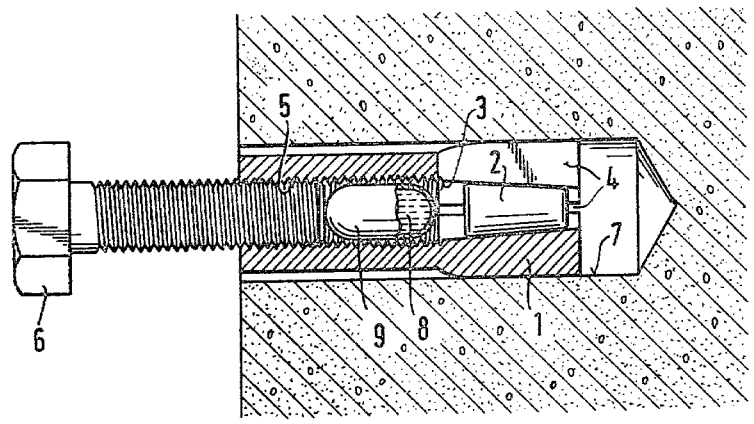
FIG. 1 is an axially extending cross-sectional view of an expansion dowel embodying the present invention with a spreading cone inserted into the dowel for anchoring it in place but before the packaged flowable substance is injected into the bore of the dowel.
Figure 2:
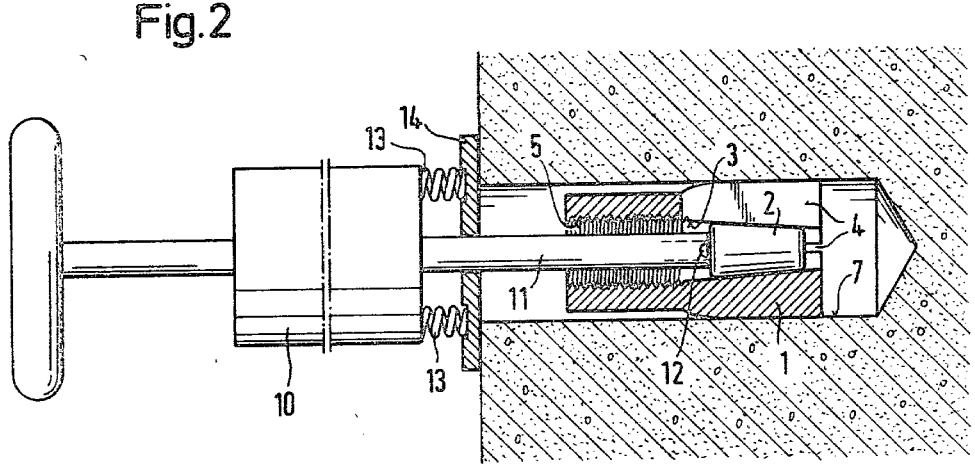
FIG. 2 is a cross-sectional view similar to FIG. 1 illustrating an expansion dowel with the expansion cone anchoring the sleeve of the dowel and with an injecting member positioned for discharging the flowable substance into the bore in the dowel.

In FIGS. 1 and 2 an expansion dowel is illustrated formed of an axially extending expansion sleeve 1 and a frusto-conically shaped expanding cone 2. In the description, the various parts are referred to as having a leading end and a trailing end, the leading end is the end which is inserted first into the borehole 7 and the trailing end is the opposite end of the member. As viewed in FIGS. 1 and 2 the right-hand end of the sleeve 1 is its leading end and the left-hand end is its trailing end. The sleeve 1 has a bore 3 extending from its leading end to its trailing end and starting at the leading end the bore tapers outwardly for an axially extending part of the sleeve. The front part of the sleeve extending from the leading end has a number of axially extending slots 4 which extend in the radial direction from the surface of the bore to the outside surface of the sleeve. The slots are open at the leading end of the sleeve. The number of slots 4 can be chosen arbitrarily. From the larger diameter end of the tapered portion of the bore, a threaded portion 5 extends to the trailing end. The threaded portion receives a threaded bolt 6, as shown in FIG. 1.

In both FIGS. 1 and 2, the front portion of the sleeves containing the slots 4 have been radially expanded by the expanding cone 2 so that the sleeve 1 is anchored within the borehole 7. In the front portion of the sleeve its outside surface is in closely fitting contact with the surface of the borehole 7 extending rearwardly from the trailing end of the longitudinal slots, however, the outside surface of the sleeve is spaced radially inwardly from the surface of the borehole so that an annular space remains after the dowel has been anchored in the borehole. The annular space about the rear portion of the sleeve forms a part of the open space between the outside surface of the sleeve and the surface of the borehole 7.

In FIG. 1, a container 9 is positioned between the leading end of the bolt 6 and the trailing end of the cone 2. The container 9 is filled with a flowable substance 8 including a corrosion protection material. Container 9 is placed in the bore 3 after the sleeve has been anchored by the expanding cone 2. With the container 9 in position, the threaded bolt 6 is screwed into the bore and moved axially against the container until it breaks so that the flowable substance 8 can flow into the open space or spaces between the sleeve 1 and the surface of the borehole by passing through the axially extending slots 4. The open space or spaces includes the annular space between the outside surface of the sleeve and the surface of the borehole, the open space located between the leading end of the sleeve and the bottom of the borehole and any remaining open spaces. Accordingly, any exposed surfaces of the sleeve are enclosed or coated by the flowable substance 8. The flowable substance 8 held within the container 9 can remain in the plastic condition after it covers the surfaces of the expansion dowel or it can harden over a period of time. Furthermore, the use of a hardenable flowable substance has the advantage that it provides not only corrosion protection but improves the anchoring or holding values of the expansion dowel.

In FIG. 2, the axially extending sleeve 1 of the expansion dowel is anchored within the borehole 7 by the expanding cone 2 which has been forced through the sleeve toward its leading end so that the outside surface of the front portion of the sleeve is in closely fitting contact with the surface of the borehole. Furthermore, the trailing end of the sleeve is inset or countersunk within the borehole, that is, it is spaced inwardly from the surface of the material in which the borehole is formed. As a result, the trailing end of the sleeve is spaced from the opening into the borehole 7.

In addition, FIG. 2 illustrates an injection member 10 used for injecting or forcing the flowable substance 8 into the bore of the sleeve. The member 8 may be of various constructions, for example, it can be a grease gun type of member or it can be arranged to receive cartridges containing the various components of the flowable substance 8. The injection member 10 as shown in FIG. 2, includes a feed pipe 11 extending into the bore of the expansion sleeve 1. At its leading end, the feed pipe 11 has an outlet aperture 12. The position of the outlet aperture 12 from the feed pipe 11 has the advantage that the flowable substance 8 is injected at a position spaced inwardly from the opening to the borehole so that the flowable substance can, by increased pressure, flow outwardly from the sleeve bore through the slots 4 into the open space or spaces between the sleeve and the surface of the borehole. Therefore, it is guaranteed that all of the open spaces about the expansion dowel are filled with the flowable substance 8. Moreover, the injection member 10 includes a pressure plate 14 which is biased against the surface of the receiving material containing the borehole by springs 13 extending between the injection member body and the pressure plate. The pressure plate provides a closure for the opening from the borehole so that the flowable substance is retained within the borehole.

As displayed in FIG. 2, the flowable substance moves from the outlet aperture 12 through the slots 4 into the open spaces about the sleeve within the borehole and flows toward the trailing end of the sleeve moving over the radially inwardly recessed surface of the sleeve. At the trailing end of the sleeve, the flowable substance 8 provides a seal for the trailing end, accordingly, this surface of the expansion dowel is protected against corrosion. When the injection member 10 includes a pressure plate 14, it limits the space between the trailing end of the sleeve 1 and the opening from the borehole so that excessive use of the flowable substance 8 is prevented. Covering the trailing end of the expansion sleeve can be effected in other ways besides using the injection member 10. For instance, it can be achieved by utilizing premeasured quantities of the flowable substance 8 packed into containers or cartridges. Therefore, the extent of the insertion of the expansion dowel into the borehole must be considered when adjusting the amount of flowable material provided in the containers.

When an injection member 10 is used, as illustrated in FIG. 2, it is possible to use any type of flowable substance 8. Substances which remain plastic or which harden with time can be utilized.

While specific embodiments of the invention have been shown and described in detail to illustrate the application of the inventive principles, it will be understood that the invention may be embodied otherwise without departing from such principles.

What is claimed is:

1. Method of securing an expansion dowel in a borehole in a receiving material where the expansion dowel comprises an axially elongated metal expansion sleeve having a leading end which is inserted first into the borehole and a trailing end, the sleeve has an axially extending bore therethrough axially extending slots are formed in the sleeve extending radially outwardly from the bore to the outside surface of the sleeve with the slots extending from the leading end of the sleeve to a plane extending transversely of the axis of the sleeve intermediate the leading and trailing ends, the bore is cylindrically shaped and threaded from the trailing end for a portion of the axial length of the bore and the bore extending from the leading end is frusto-conically shaped toward the cylindrically shaped portion and the diameter of the frusto-conically shaped portion increases from the leading end to the diameter of the cylindrically shaped portion, a frusto-conically shaped expanding cone is positioned in the frusto-conically shaped portion of the bore and the cone has a maximum diameter smaller than the diameter of the cylindrically shaped part of the bore and is shaped complementary to the frusto-conically shaped portion of the bore, the method comprising the steps of inserting the sleeve into the borehole and inserting the cone into the frusto-conically shaped portion of the bore and displacing the cone axially through the bore toward the leading end and expanding the portion of the sleeve containing the slots radially outwardly into holding engagement with the surface of the borehole with the portion of the sleeve located axially rearwardly of the frusto-conically shaped portion remaining in spaced relationship from the surface of the borehole, injecting a flowable substance into the bore in the sleeve so that the substance flows outwardly through the slots into the open spaces between the outside surface of the sleeve and the juxtaposed surface of the borehole, wherein the improvement comprises using a corrosion prevention material as at least a part of the flowable substance and depositing an enclosing layer of the material for protecting the expansion sleeve against corrosion, and using a pressure generating injection member having an outlet opening between the trailing end of the cone and the trailing end of the sleeve for injecting the flowable substance, and introducing the outlet opening into the bore within the expansion sleeve rearwardly of the cone.

2. Method, as set forth in claim 1, including using an injection member having an outlet opening for injecting the flowable substance and threading the part of the injection member having the outlet opening into the threaded portion of the bore in the expansion sleeve.

3. Method, as set forth in claim 2, wherein the injection member is of the grease gun type.

4. Method, as set forth in claim 2, including inserting cartridges containing the flowable substance into the injection member.

5. Method, as set forth in claim 1, including injecting the flowable substance into the open spaces between the outer surface of the sleeve and the juxtaposed surface of the borehole until the flowable substance flows axially from between the trailing end of the sleeve and the juxtaposed surface of the borehole.

6. Method, as set forth in claim 1, including injecting a measured amount of the flowable substance into the bore of the expansion sleeve for providing a sufficient amount of the flowable substance for filling the open spaces between the sleeve and the surface of the borehole.

7. Method, as set forth in claim 1, including forming the borehole with a greater axial length than the axial length of the sleeve, inserting the sleeve into the borehole so that the trailing end thereof is spaced inwardly from the surface of the receiving material into which the borehole is formed, and injecting the flowable substance into the bore in the sleeve so that it flows outwardly through the slots and rearwardly over the trailing end of the expansion sleeve.

8. Method, as set forth in claim 1, including using a flowable substance which is hardenable after it is injected and flows into the open spaces between the sleeve and the surfaces of the borehole.

9. Method, as set forth in claim 8, wherein the flowable substance includes a liquid synthetic resin as the binder and block hardeners which effect a hardening of the resin binder due to the influence of at least one of air and moisture.

10. Method, as set forth in claim 8, wherein the flowable substance consists of a single component reaction resin hardenable under volume increase due to the influence of moisture.

11. Method, as set forth in claim 1, wherein the flowable substance includes an oil as the binder which dries under oxidizing action.

12. A method, as set forth in claim 1, wherein the flowable substance includes a soft plastic material including at least one of softened bitumen and softened coat tar pitch.

13. Method, as set forth in claim 1, wherein the flowable substance consists of a soft plastic material including at least one of a softened resin and synthetic resin.

14. Method, as set forth in claim 12 or 13, wherein the flowable substance includes a corrosion preventing pigment.

15. Method, as set forth in claim 1, wherein the flowable substance comprises a cement, a filling material, and an oily binder which remains plastic.

16. Method, as set forth in claim 15, wherein the oily binder can be one of mineral oil and a plastics material.

17. Method, as set forth in claim 1, wherein the flowable substance includes a corrosion preventing pigment.

18. Method, as set forth in claim 17, wherein the corrosion preventing pigment is selected from one of the group of red lead, calcium plumbates and chromates.

* * * * *